(12) United States Patent
Das

(10) Patent No.: US 10,802,719 B2
(45) Date of Patent: Oct. 13, 2020

(54) METHOD AND SYSTEM FOR DATA COMPRESSION AND DATA STORAGE OPTIMIZATION

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 270 days.

(21) Appl. No.: 16/049,878

(22) Filed: Jul. 31, 2018

(65) Prior Publication Data
US 2019/0377498 A1 Dec. 12, 2019

(30) Foreign Application Priority Data
Jun. 11, 2018 (IN) .............................. 201841021795

(51) Int. Cl.
*G06F 3/06* (2006.01)
*G06F 12/10* (2016.01)

(52) U.S. Cl.
CPC .......... *G06F 3/0608* (2013.01); *G06F 3/0641* (2013.01); *G06F 3/0673* (2013.01); *G06F 12/10* (2013.01)

(58) Field of Classification Search
CPC ...... G06F 3/06–0689; G06F 2003/0691–0698; G06F 16/174–1756; G06F 40/146; G06F 2211/007; G06F 2211/1014
See application file for complete search history.

(56) References Cited

U.S. PATENT DOCUMENTS

| 5,934,534 A | 8/1999 | Schmidt et al. |
| 7,386,046 B2 | 6/2008 | Fallon et al. |
| 2014/0344515 A1* | 11/2014 | Wang ............... G06F 9/3895 711/110 |
| 2015/0326245 A1* | 11/2015 | Li ........................ H03M 7/30 707/693 |
| 2017/0364474 A1* | 12/2017 | Noyes ............... G06F 9/4498 |

(Continued)

OTHER PUBLICATIONS

"Data Compression in the Intel Solid-State Drive 520 Series". url:http://www.asbis.ro/download/Intel_SSD_520_Series_Compression_Technology_Brief.pdf 2012. Intel Corporation, 2 pages.

*Primary Examiner* — Nicholas J Simonetti
(74) *Attorney, Agent, or Firm* — Finnegan, Henderson, Farabow, Garrett & Dunner, LLP

(57) ABSTRACT

This disclosure relates to method and system for data compression and data storage optimization. The method of compression may include converting each data block into a matrix, compressing each data block by processing the corresponding matrix to form a minimum state matrix based on a sequential set of compression rules, deriving a granular metadata for each data block based on the corresponding minimum state matrix, and storing the granular metadata and the sequential set of compression rules for each data block. Further, the method of decompression may include accessing a granular metadata and a sequential set of compression rules for each data block, deriving a minimum state matrix for each data block based on the corresponding granular metadata, decompressing each data block by processing the corresponding minimum state matrix to form a matrix based on the sequential set of compression rules, and building each data block from the corresponding matrix.

24 Claims, 10 Drawing Sheets

(56) References Cited

U.S. PATENT DOCUMENTS

| | | | |
|---|---|---|---|
| 2018/0158013 A1* | 6/2018 | Fu | G06Q 10/083 |
| 2018/0159553 A1* | 6/2018 | Sharon | H03M 13/3746 |
| 2018/0188961 A1* | 7/2018 | Venkatesh | G06F 3/0638 |
| 2018/0188972 A1* | 7/2018 | Yang | G06F 3/0658 |
| 2019/0121889 A1* | 4/2019 | Gold | G06F 3/061 |
| 2019/0361954 A1* | 11/2019 | Page | G06F 16/9024 |

* cited by examiner

FIG. 3 — 300

| Block Address | Block Name | Sliced Block Size | Reduced Block Size |
|---|---|---|---|
| BL#45-0112 | FC-1-LUN-redhat | 4 Kb | 800 b |
| BL#65-0125 | FC-2-LUN-windowsserver | 4 Kb | 1 Kb |
| BL#45-0114 | FC-1-LUN-solaris | 4 Kb | 925 b |
| BL#45-0129 | FC-2-LUN-vsphere | 4 Kb | 1.9 Kb |

|  | 000 | 001 | 010 | 011 | 100 | 101 | 110 | 111 |
|---|---|---|---|---|---|---|---|---|
| R#0001 | 0 | 1 | 1 | 0 | 0 | 1 | 0 | 1 |
| R#0002 | 1 | 0 | 0 | 1 | 0 | 1 | 1 | 0 |
| R#0003 | 1 | 0 | 1 | 0 | 1 | 0 | 1 | 0 |
| R#0004 | 0 | 0 | 0 | 1 | 0 | 1 | 1 | 1 |
| R#0005 | 0 | 0 | 0 | 0 | 1 | 1 | 0 | 1 |
| R#0006 | 1 | 0 | 1 | 0 | 1 | 1 | 1 | 0 |
| R#0007 | 1 | 0 | 1 | 1 | 0 | 0 | 0 | 0 |

METHOD AND SYSTEM FOR DATA COMPRESSION AND DATA STORAGE OPTIMIZATION

TECHNICAL FIELD

This disclosure relates generally to data storage management, and more particularly to method and system for data compression and data storage optimization.

BACKGROUND

In today's digital world, the overall IT infrastructure depends primarily on storage, network and virtualization. Generally, an enterprise storage system may provide for data storage optimization in order to efficiently utilize storage space. Additionally, data storage optimization may help in reducing storage utilization rate.

In many of the existing storage management systems, data storage optimization may be achieved by eliminating redundant datasets. As will be appreciated, there are multiple techniques for eliminating redundant datasets. These techniques include, but are not limited to, deduplication and thin provisioning. In deduplication, redundant data blocks are eliminated by retaining a single copy of data bock in the storage cell while removing unnecessary copies. Additionally, in thin provisioning, only those data that are required to be written by a host are stored on actual storage array. However, such techniques typically do not include minimizing or compressing original datasets for data storage optimization. Moreover, eliminating the redundant data blocks may increase reference count of an internal optimizer, which, in turn, may reduce efficiency of storage.

Some of the existing storage management systems have data reduction and optimization techniques that may be employed at different levels. The different levels may include application level, block level, file level, or virtual machine (VM) level. However, these techniques do not minimize original datasets and may not contribute much in increasing storage efficiency of storage devices. For example, most storage systems inbuilt with various data reduction technique perform optimization in VM level or perform deduplication of data blocks. However, the data blocks are optimized up to original data only.

SUMMARY

In one embodiment, a method for compressing data is disclosed. In one example, the method may include converting each of a plurality of data blocks, of a pre-defined data block size, into a matrix, of a pre-defined matrix size, so as to enable bit-level data manipulation. The method may further include compressing each of the plurality of data blocks by processing the corresponding matrix to form a minimum state matrix based on a sequential set of compression rules. The method may further include deriving a granular metadata for each of the plurality of data blocks based on the corresponding minimum state matrix. The method may further include storing the granular metadata and the sequential set of compression rules for each of the plurality of data blocks.

In one embodiment, a method for decompressing data is disclosed. In one example, the method may include accessing a granular metadata and a sequential set of compression rules for each of a plurality of data blocks of a pre-defined data block size. The method may further include deriving a minimum state matrix for each of the plurality of data blocks based on the corresponding granular metadata. The method may further include decompressing each of the plurality of data blocks by processing the corresponding minimum state matrix to form a matrix based on the sequential set of compression rules. The method may further include building each of the plurality of data blocks from the corresponding matrix.

In one embodiment, a system for compressing data is disclosed. In one example, the system may include at least one processor and a memory communicatively coupled to the at least one processor. The memory may store processor-executable instructions, which, on execution, may cause the processor to convert each of a plurality of data blocks, of a pre-defined data block size, into a matrix, of a pre-defined matrix size, so as to enable bit-level data manipulation. The processor-executable instructions, on execution, may further cause the processor to compress each of the plurality of data blocks by processing the corresponding matrix to form a minimum state matrix based on a sequential set of compression rules. The processor-executable instructions, on execution, may further cause the processor to derive a granular metadata for each of the plurality of data blocks based on the corresponding minimum state matrix. The processor-executable instructions, on execution, may further cause the processor to store the granular metadata and the sequential set of compression rules for each of the plurality of data blocks.

In one embodiment, a system for decompressing data is disclosed. In one example, the system may include at least one processor and a memory communicatively coupled to the at least one processor. The memory may store processor-executable instructions, which, on execution, may cause the processor to access a granular metadata and a sequential set of compression rules for each of a plurality of data blocks of a pre-defined data block size. The processor-executable instructions, on execution, may further cause the processor to derive a minimum state matrix for each of the plurality of data blocks based on the corresponding granular metadata. The processor-executable instructions, on execution, may further cause the processor to decompress each of the plurality of data blocks by processing the corresponding minimum state matrix to form a matrix based on the sequential set of compression rules. The processor-executable instructions, on execution, may further cause the processor to build each of the plurality of data blocks from the corresponding matrix.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a tabular representation of exemplary data blocks processed by an exemplary block addressing module, in accordance with some embodiments of the present disclosure.

FIG. 4 is an exemplary data block of a pre-defined data block size.

FIG. 5 is the data block of FIG. 3 reorganized as a matrix, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
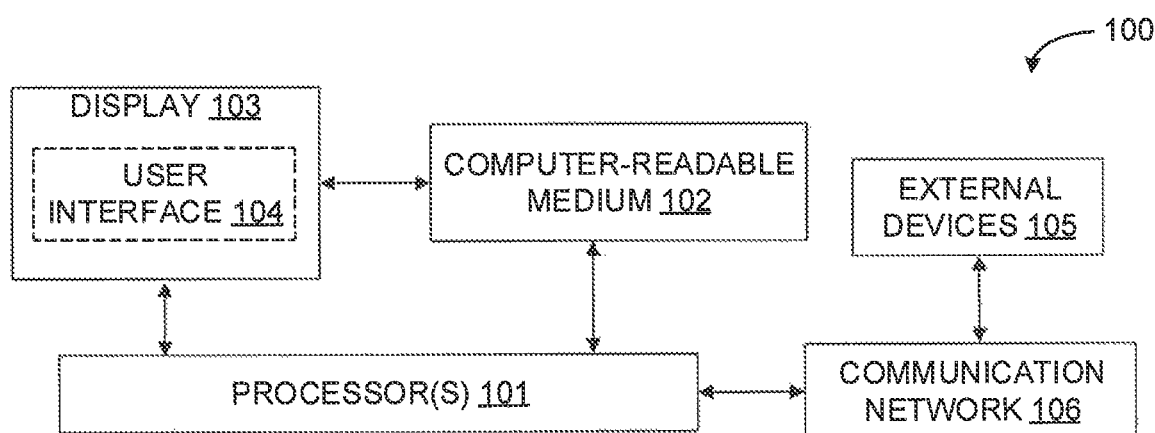
FIG. 1 is a block diagram of an exemplary system for data compression and data storage optimization in accordance with some embodiments of the present disclosure.

Referring now to FIG. 1, an exemplary system 100 for data compression and data storage optimization is illustrated in accordance with some embodiments of the present disclosure. The system 100 may include a computing device including, but may not be limited to, server, desktop, laptop, notebook, netbook, tablet, smartphone, and mobile phone. The system 100 may implement a data compression and decompression device so as to compress and decompress data. As will be described in greater detail in conjunction with FIGS. 2-14, the data compression and decompression device may perform data compression by converting each data block into a matrix, compressing each data block by processing the corresponding matrix to form a minimum state matrix based on a sequential set of compression rules, deriving a granular metadata for each data block based on the corresponding minimum state matrix, and storing the granular metadata and the sequential set of compression rules for each data block. Further, as will be described in greater detail in conjunction with FIGS. 2-14, the data compression and decompression device may perform data decompression by accessing a granular metadata and a sequential set of compression rules for each data block, deriving a minimum state matrix for each data block based on the corresponding granular metadata, decompressing each data block by processing the corresponding minimum state matrix to form a matrix based on the sequential set of compression rules, and building each data block from the corresponding matrix.

The system 100 may include one or more processors 101, a computer-readable medium (e.g., a memory) 102, and a display 103. The computer-readable storage medium 102 may store instructions that, when executed by the one or more processors 101, cause the one or more processors 101 to compress or decompress data in accordance with aspects of the present disclosure. The computer-readable storage medium 102 may also store various data (e.g., original data block, data blocks of pre-defined block size, unique virtual block addresses, block names, matrix of pre-defined matrix size, minimum state matrix, set of compression rules, granular metadata, mapping among unique virtual addresses and metadata and set of compression rules, key hash table, etc.) that may be captured, processed, and/or required by the system 100. The system 100 may interact with a user via a user interface 104 accessible via the display 103. For example, the user may request for compression of data or decompression of compressed data via the user interface. The system 100 may also interact with one or more external devices 105 over a communication network 106 for sending or receiving various data. The external devices 105 may include, but are not limited to, a remote server, a digital device, a storage device, or another computing system.

Figure 2:
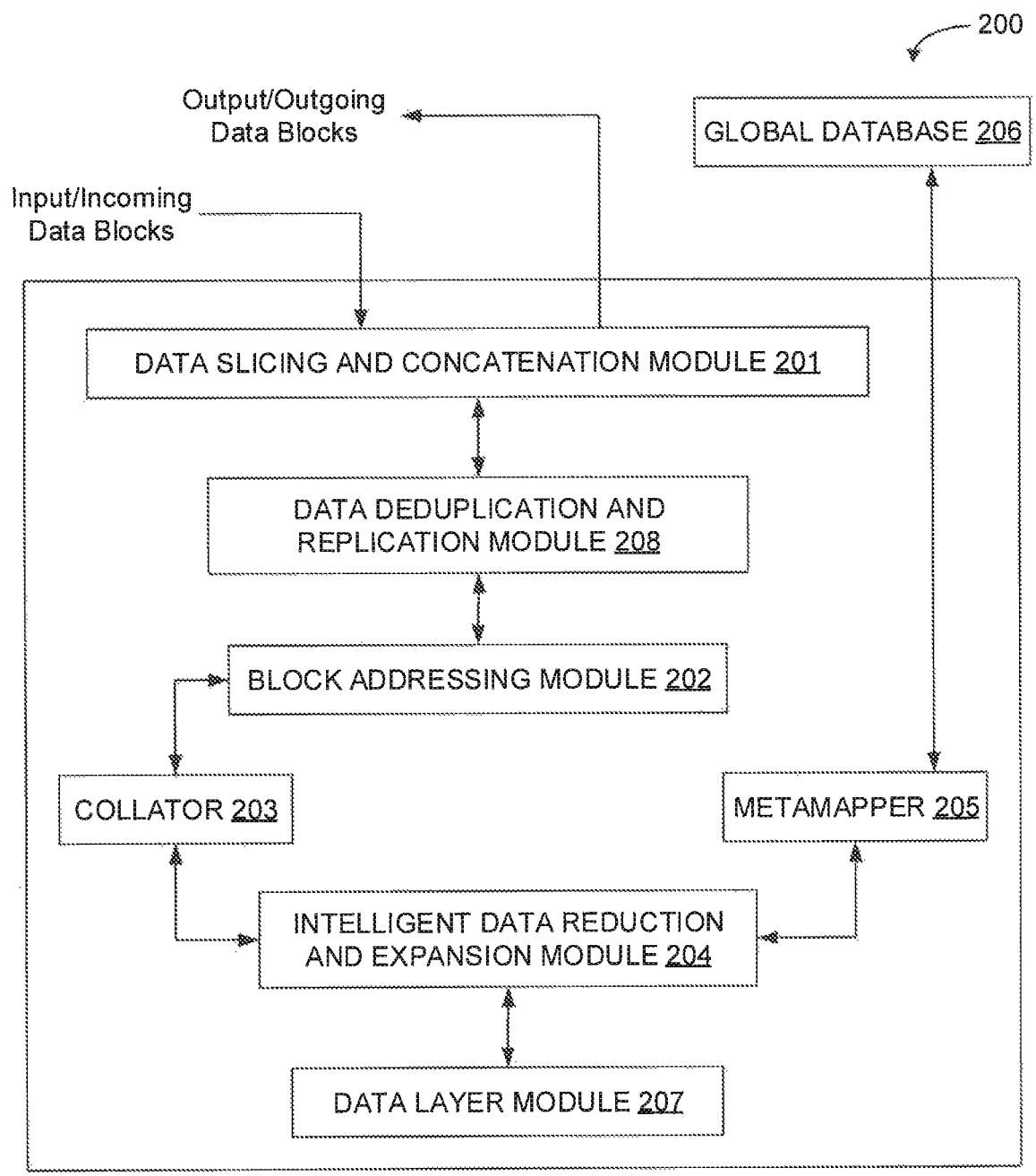
FIG. 2 is a functional block diagram of data compression and decompression device, implemented by the system of FIG. 1, in accordance with some embodiments of the present disclosure.

Referring now to FIG. 2, a functional block diagram of the compression and decompression device 200, implemented by the system 100 of FIG. 1, is illustrated in accordance with some embodiments of the present disclosure. The compression and decompression device 200 may include various modules that perform various functions so as to perform compression and decompression of data. In some embodiments, the compression and decompression device 200 may include a data slicing and concatenation module 201, a block addressing module 202, a collator 203, an intelligent data reduction and expansion module 204, a metamapper 205, a global database 206, and a data layer module 207. Additionally, in some embodiments, the compression and decompression device 200 may include a data deduplication and replication module 208. As will be appreciated by those skilled in the art, all such aforementioned modules and the database 201-208 may be represented as a single module or a combination of different modules. Moreover, as will be appreciated by those skilled in the art, each of the modules and the database 201-208 may reside, in whole or in parts, on one device or multiple devices in communication with each other.

The data slicing and concatenation module 201 may receive input or incoming data blocks for data compression. Each of the input or incoming data blocks may then be sliced into a number of uniform data blocks of a pre-defined block size. It should be noted that the pre-defined size may be dependent on computing platform or data storage platform implementing the compression and decompression device 200. For example, the pre-defined size may be 4 Kb, 8 Kb, 16 Kb, 32 Kb, or the like. It should be noted that, in some embodiments, the pre-defined size may not be limited to exponential of 2 Kb but may include any size such as 3 Kb, 5 Kb, 6 Kb, or the like. Further, it should be noted that, the portion of data from next data blocks may be combined so as to form uniform data blocks. For example, if a 9 Kb of data block need to be sliced into 4 Kb of uniform data blocks, then 3 Kb of data from next data block may be appended so as to form 3 data blocks of 4 Kb each. Each of the sliced data blocks may also be labeled. The sliced and labeled data blocks may be sent to the block addressing module 202 either directly or through the data deduplication and replication module 208. Further, during data decompression, the data slicing and concatenation module 201 may receive uniform data blocks of the pre-defined block size from the block addressing module 202 either directly or through the data deduplication and replication module 208. The data slicing and concatenation module 201 may then concatenate the uniform data blocks so as to provide output or outgoing data blocks.

In some embodiments, upon receiving sliced and labeled data blocks from the data slicing and concatenation module 201, the data deduplication and replication module 208 may perform deduplication and thin provisioning of the uniform data blocks so as to eliminate redundant blocks. Upon deduplication and thin provisioning, the data blocks may be sent to block addressing module 202. Further, in some embodiments, upon receiving the uniform data blocks from the block addressing module 202, the data deduplication and replication module 208 may perform replication of data blocks that were de-duplicated earlier. As will be appreciated, the replication may be performed by duplicating data blocks based on pointers and references for eliminated data blocks.

It should be noted that any storage system may be evaluated based on number of IOPS (inputs or outputs per second). The IOPS may characterize storage drives in terms of huge scalable datasets. It may be in terms of megabyte (Mb), gigabyte (Gb) and terabyte (Tb) depending upon various applications that involve computer storage devices like HDD, SSD, or storage area networks (SAN). These datasets may be addressed as a block or as a file based on storage system architecture.

The block addressing module 202 may provide address for each uniform data block obtained after the elimination of redundant data blocks. As will be appreciated, the addresses may help to identify each and every data blocks uniquely. It should be noted that each uniform data block may have its own original write data and read data operation. Further, it should be noted that the address may be logical or virtual address that may eventually map on to a corresponding physical address. For read data operation, the uniform data blocks may be identified by their virtual address. Further, it should be noted that each of the uniform data blocks may be provided with a virtual address which is required by the intelligent data reduction and expansion module 204 to identify data block uniquely.

Referring now to FIG. 3, a tabular representation 300 of exemplary data blocks processed by the block addressing module 201 is illustrated, in accordance with some embodiments of the present disclosure. As stated above, each of the uniform data blocks may be provided with a block address. The block address is a unique address of a data block that may enable block transaction between different modules 201-207 of the compression or decompression device 200. It should be noted that the block address may not be the physical address. It may be an address that may help in mapping various parameters (e.g., metadata, set of compression rules) of the uniform data block. Thus, the block address may help to connect to a data block with the correct metadata or the rules required for subsequent processing (e.g., decompression).

The block name is the unique name provided to each block that has been generated from a particular system or host. The system or host may include, but may not be limited to, REDHAT®, WINDOWS® Server, SOLARISO, VSPHERE®, or the like. Thus, the block name may help to identify the source from where the data has been generated. As illustrated, each of the data blocks has been generated from different type of host operating system. Moreover, the block name may also include a logical unit number (LUN) that may help in identifying a device for data storage. For example, FC-1-LUN-redhat may help to identify volume logical unit number (LUN) of a block (BL#45-0112) that may make data storage easy.

The block size may denote size of sliced or uniform data block after being broken down or sliced by the data slicing and deduplication module 201, while the reduced block size may denote size of compressed data blocks after being compressed by the intelligent data reduction and expansion module 204. It should be noted that the block addressing module 202, initially, may not be aware of the reduced block size. However, once the compression is performed by the intelligent data reduction and expansion module 204, the size of the compressed data block may be communicated to the block addressing module 202 by the intelligent data reduction and expansion module 204. Further, as stated above, the block size of the sliced data block may vary depending on system architecture of storage system. The block size for each block may be 4 KB chunk that may be reduced or compressed to 800 bytes or 1 Kb. As illustrated, a data block with block address BL#45-0112 in REDHAT® system may be reduced to 800 bytes. It should be noted that the data blocks may be required to be uniform with equal block size before sending to the collator 203. However, in case, if any of the data blocks are larger or greater than the defined data block size, then the data block may be forwarded to an I/O control flow module (not shown) of the system.

Referring back to FIG. 2, the collator 203 may identify each data block by its block address and may reorganize the data block into a vector matrix form. In some embodiments, the collator 203 may align all the data blocks in terms of bit of datasets organized into the matrix form. As will be appreciated, the datasets reorganized or framed as matrix may allow for identifying as well as accessing the values in terms of rows and columns. Referring now to FIG. 4, an exemplary data block 400 of a pre-defined data block size (for example, 4 Kb) is illustrated. As will be appreciated, the data block 400 may include irregular bits. The collator 203 may frame or reorganize the data sets of the data block 400 into a matrix form. Referring now to FIG. 5, the data block 400 reorganized or framed as a matrix 500 is illustrated, in accordance with some embodiments of the present disclosure. Thus, the collator 203 may help in making an irregular data chunk, such as data block 400, uniform by framing it in the form of vector matrix, such as matrix 500.

Figures 6, 7:
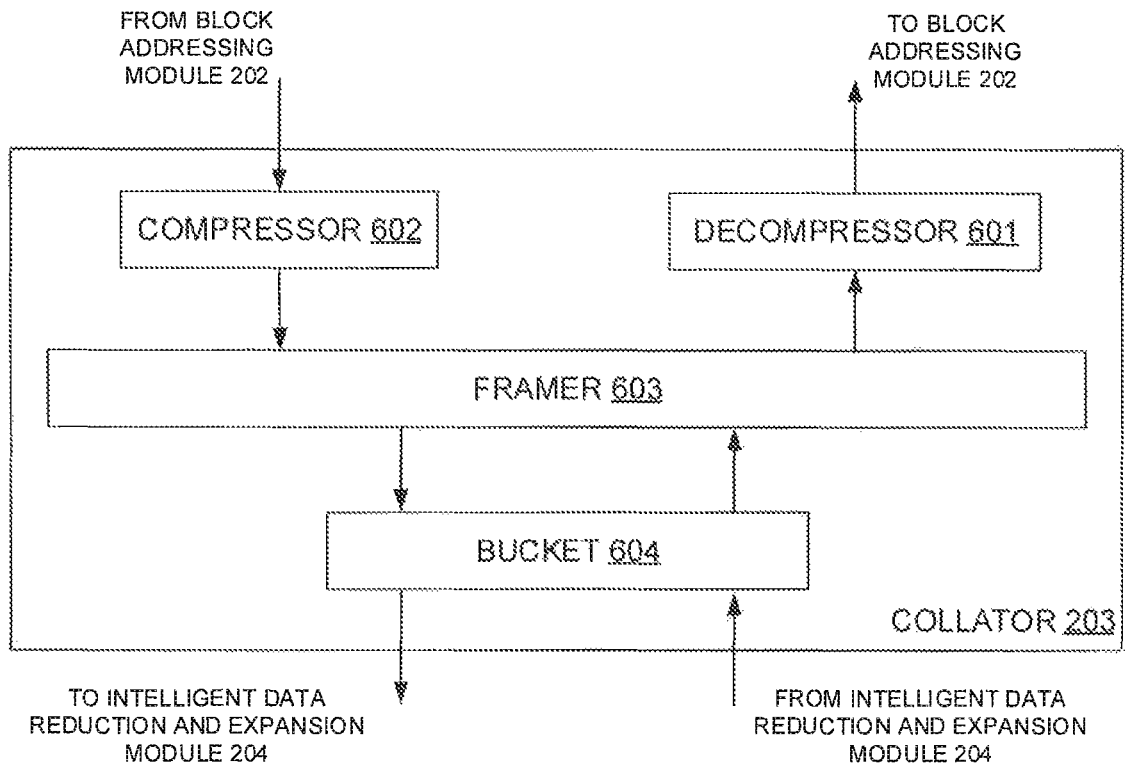
FIG. 6 is a functional block diagram of an exemplary collator, in accordance with some embodiments of the present disclosure.
FIG. 7 is an exemplary data block of a pre-defined data block size framed as an exemplary matrix of a pre-defined matrix size, in accordance with some embodiments of the present disclosure.

Referring now to FIG. 6, a functional block diagram of the collator 203 is illustrated, in accordance with some embodiments of the present disclosure. The collator 203 may include a decompressor 601, a compressor 602, a framer 603, and a bucket 604. The collator 203 may facilitate compression of uniform data block as well as decompression of compressed or reduced data blocks. In particular, the collator 203 may convert each data block into corresponding vector matrix during compression. Further, the collator 203 may convert back each vector matrix into corresponding data block during decompression. As will be described in greater detail below, the process of conversion and back conversion of the data block is carried out through the compressor 602 and decompressor 601 respectively.

The decompressor 601 and the compressor 602 may hold decompress and compress IOPS respectively that may enable to determine data blocks separately. For decompress IOPS, the bits may be reconstructed by removing the matrix form. The bits may then be collated in form of blocks in block addressing module 202. In the block addressing module 202, the bits may be aligned in frame and then forwarded to a routing module (not shown) for pushing into other IO module.

Further, for compress IOPS, the data bits may be taken and put back into matrix form by the compressor 602. In some embodiments, the compressor 602 may take a fixed number of bits together and may then put back into the matrix form. Thus, the bits matrix may be streamlined to a fixed number of columns and N rows as per the pre-defined data block size (that is, 4 Kb, 8 Kb, or 16 Kb). It should be noted that, in some embodiments, the number of columns may be 4, 8, 16, 32, or the like. In such embodiments, for all types of block distribution, there will be only the fixed number of columns with varying number rows. For example, a matrix of 8 columns (i.e., taking 8-bits at a time) may have 8, 16 or N number of rows depending on the type of block distribution. It should be noted that that column size of 8-bits is a design choice and, in alternative embodiments, the compressor 602 may take 16-bits, 32-bits, 64-bits, or 128-bits together as a different design choice. In particular, in some embodiments, the number of columns may be of the order 4×2N such that it approximated to the nearest square root of total number of data bits in the vector matrix so as to have about same number of rows. For example, if there are 16000 data bits, then the compressor 602 may compute square root 16000 (i.e., 126.49) to determine required number of columns (i.e., 128) and, therefore, required number of rows (i.e., 128). It should be noted that, in case some of the cells of the matrix are empty, then the compressor 602 may pull out the required number of data bits from the next block and fill up the empty cells. For example, in the above case, the total number of data bits that may be accommodated in the 128×128 matrix is 16384. Thus, the compressor 602 may pull 384 data bits from next blocks and fill up the gap. In such case, the logical address may be updated accordingly. Further, it should be noted that, in case only few data bits are left in the end of a data block and not committing to the number of cells in the matrix, then the compressor 602 may store these data bits temporarily and may bind them with next data block.

The framer 603 may frame all the bits of a data block of a pre-defined data block size (e.g., 2 Kb) in form of a matrix of a pre-defined matrix size (e.g., 128 column×N rows). Thus, the framer 603 may provide a matrix shape to the data. Additionally, the framer 603 may complete the matrix with filled rows in the end. In other words, if the bit ends up with incomplete datasets in a column, then the bit may be added to the next chunks bit. The frames may then be broken into 128 bits and dumped into the matrix. Thus, there will be only 128 column with about 128 rows depending on the bit distribution. Referring now to FIG. 7, an exemplary data block of a pre-defined data block size framed as an exemplary matrix 700 of a pre-defined matrix size is illustrated, in accordance with some embodiments of the present disclosure. As will be appreciated, this is the matrix that may be subsequently reduced so as to compress the data. Alternatively, this is the matrix that may be subsequently formed after decompressing the data.

Referring back to FIG. 6, the bucket 604 may be used to store the data set in terms of matrix for every 4 KB chunks of data. During compression, the data may be pushed from the bucket 604 to the intelligent data reduction and expansion module 204. In other words, the matrix datasets may be injected to the intelligent data reduction and expansion module 204 for performing data compression. Alternatively, during decompression, the data may be collected in the bucket 604 form the intelligent data reduction and expansion module 204.

Figures 8, 9A:
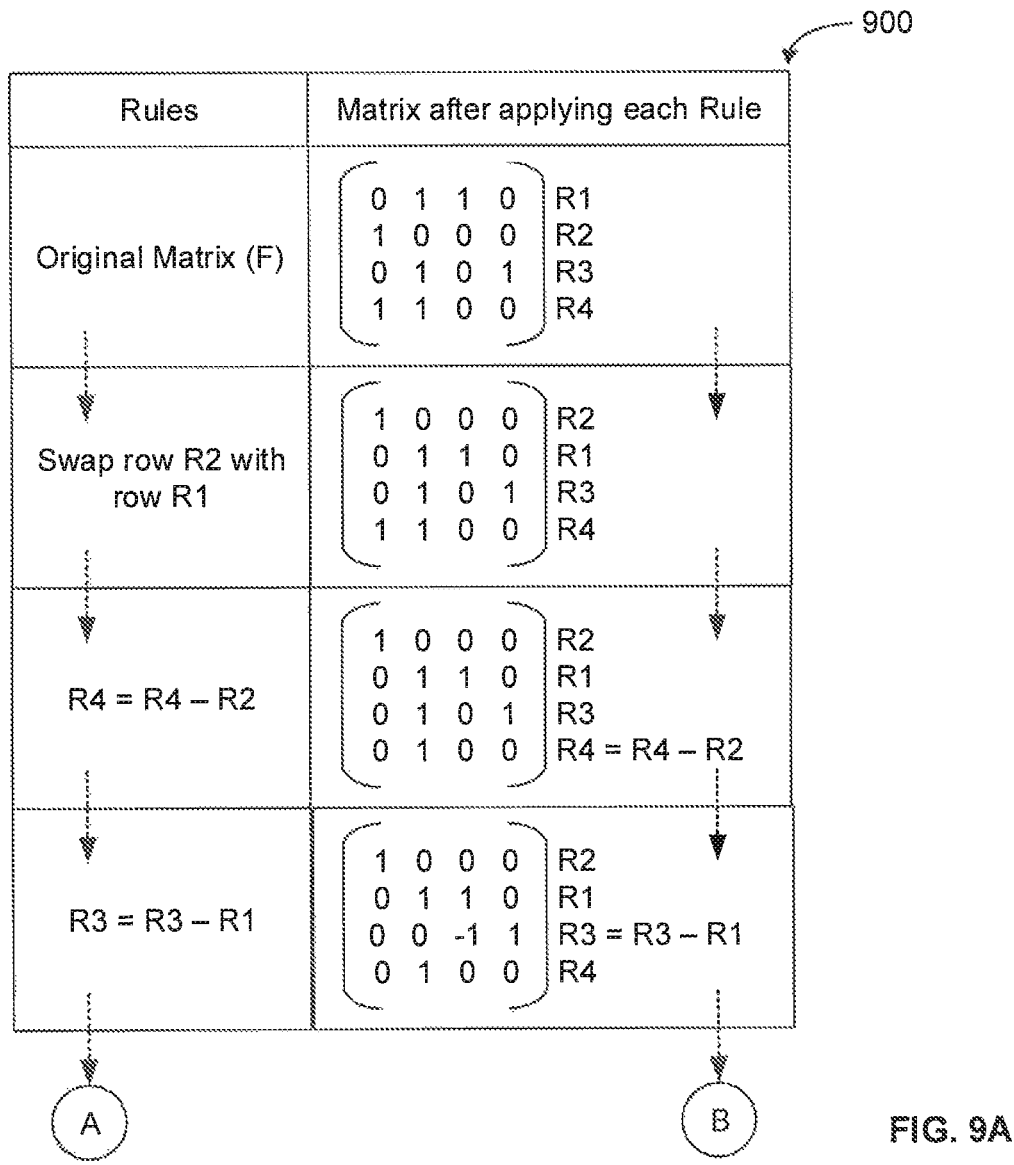
FIG. 8 is an exemplary matrix of a pre-defined matrix size for representing and identifying data bits by row identification and column identification, in accordance with some embodiments of the present disclosure.
FIG. 9A and FIG. 9B illustrate an exemplary processing of an exemplary matrix so as to form a minimum state matrix, in accordance with some embodiments of the present disclosure.

Referring back to FIG. 2, the intelligent data reduction and expansion module 204 may identify the data bit sets by their row identification (row id) and column identification (column id). Referring now to FIG. 8, an exemplary matrix 800 of a pre-defined matrix size for representing and identifying data bits by row id and column id is illustrated, in accordance with some embodiments of the present disclosure. The intelligent data reduction and expansion module 204 may further include algorithms, for reducing the bit-level matrix form of data blocks to a reduced least bit matrix or a minimum state matrix, as well for expanding (that is, retrieving) the bit-level matrix form of data blocks from the reduced least bit matrix or a minimum state matrix, in accordance with some embodiments of the present disclosure. For example, in some embodiments, the intelligent data reduction and expansion module 204 may reduce the bit-level matrix form of data block to the least bit matrix or the minimum state matrix by the algorithm described below:

Let 'i' denote row, 'j' denote column, and 'a' denote matrix element (data bit). For example, $a_{ij}=0$ or $a_{ij}=1$. The algorithm may start reading the matrix with i=1, j=1.

Step 1: If $a_{ij}=0$, swap the $i^{th}$ row with some other row below to guarantee that $a_{ij}$ is not zero while other the elements in the $i^{th}$ row is zero (i.e., $a_{(ij=n-p)}=0$). The non-zero entry in the (i, j) position is called a pivot element and the cell is called a pivot cell. If all entries in the column are zero, increase j by 1 to determine the new pivot cell.

Step 2: Divide the $i^{th}$ row by $a_{ij}$ to make the pivot entry=1.

Step 3: Eliminate all other entries in the $j^{th}$ column by subtracting suitable multiples of the $i^{th}$ row from the other rows. It should be noted that the elimination may not only by way of subtraction but may also be via addition, division, and multiplication, square, or the like.

Step 4: Increase i by 1 and j by 1 to choose the new pivot element. Return to Step 1. The algorithm may stop after processing the last row or the last column of the matrix.

As will be appreciated, the algorithm provides for a set of sequential rules employed for reducing the bit matrix with minimum bit. Once the bit matrix is reduced with minimum bit, the matrix may be stored as the least bit or minimum state matrix. The minimum state matrix values may be checked and stored in a temporary memory instance. Now, all matrix values with natural number may be detected and zeros may be eliminated. The output thus obtained may be or may be near to an identity matrix where all the diagonals are 'one' and rest all are 'zeros'. As will be appreciated, the least bit or minimum state matrix along with the sequential set of compression rules may be the reduced or compressed data.

Figure 9B:
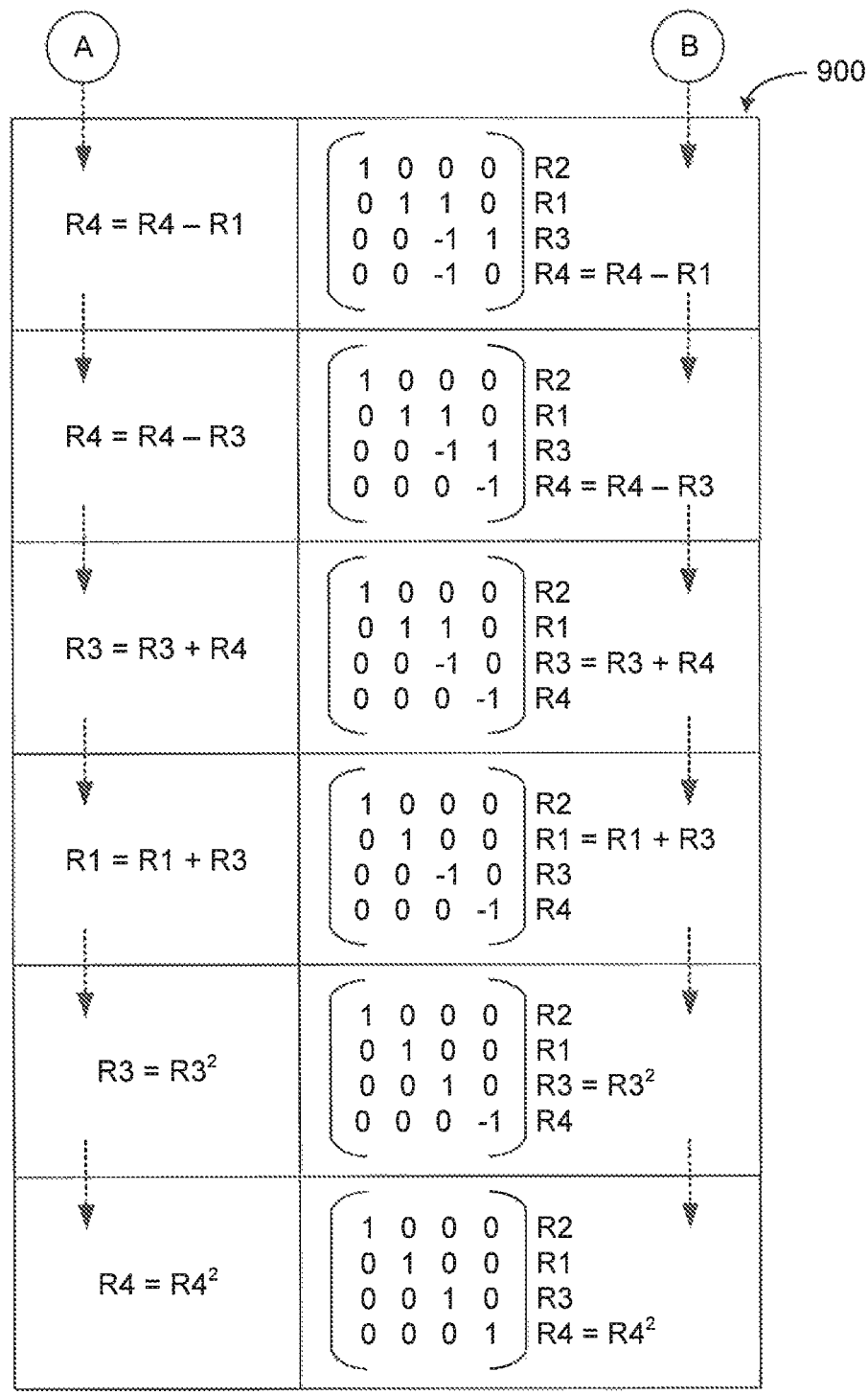

Referring now to FIG. 9A and FIG. 9B, an exemplary processing of an exemplary matrix, via the algorithm described above, so as to form a minimum state matrix is illustrated. As illustrated, the bit matrix (F) of a 4×4 size may be reduced to an identity matrix after processing the matrix (F) as per the algorithm described above. A sequential set of compression rules may evolve while processing the bit matrix as per the algorithm. Further, the identity matrix so obtained and the sequential set of compression rules so evolved may form the reduced or compressed data for the bit matrix (F). As will be appreciated, the compressed data may be retrieved back to the original bit matrix (F) by back propagating the sequential set of compression rules. It should be noted that the square operation may be performed on a row only when the row includes negative integers but no positive integers.

Referring back to FIG. 2, the metamapper 205 may store metadata and every rule that are used in operation for reducing a bit matrix. As will be appreciated, all the rules may be stored sequentially after each operation performed on the bit matrix. In some embodiments, the sequential set of rules may be stored in an efficient manner so as to achieve further compression efficiency. For example, the sequential set of rules may be stored by way of reference to a set of operations to be performed on a specific rows. Further, these rules may be mapped with a metamapper address and stored in the metamapper 205. The metamapper 205 may also help to connect the block chunks address to represent the data block. The original data may get transformed into row-column-id and value as per a format discussed below.

Figure 10:
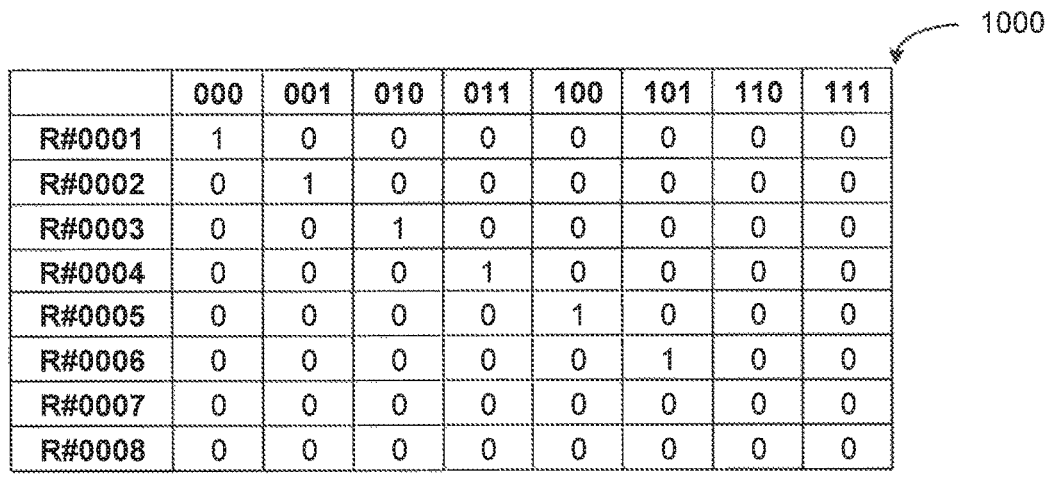
FIG. 10 is an exemplary minimum state matrix, in accordance with some embodiments of the present disclosure.

Referring now to FIG. 10, an exemplary minimum state matrix 1000 is illustrated, in accordance with some embodiments of the present disclosure. A metadata may then be derived and stored, by the metamapper 205, in the format provided by algorithm below:

Id=[(Row id)·(Column_id)=value]
Metadata=Id++

Figure 11:
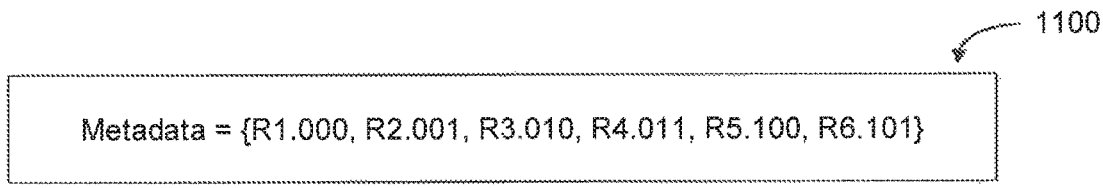
FIG. 11 is an exemplary metadata for the minimum state matrix of FIG. 10, in accordance with some embodiments of the present disclosure.

Referring now to FIG. 11, an exemplary metadata 1100 for the minimum state matrix 1000 is illustrated, in accordance with some embodiments of the present disclosure. As illustrated, the metadata 1100 for the minimum state matrix 1000 may be:

Metadata={R1.000, R2.001, R3.010, R4.011, R5.100, R6.101}

As will be appreciated, R1, R2, R3, . . . , R6 are the pointer values while the 000, 001, 010, . . . , 101 are the column values. In some embodiments, the granular metadata so derived may be further compressed to form a key hash table so as to reduce the size of the metadata. The key hash table may include mapping between physical address logical address. As will be appreciated, the logic address may be a key, while the physical address may be a value. Further, as will be appreciated, such mapping may help in reducing the number of address rewrite or change, and may also contribute to wear leveling.

Figure 12:
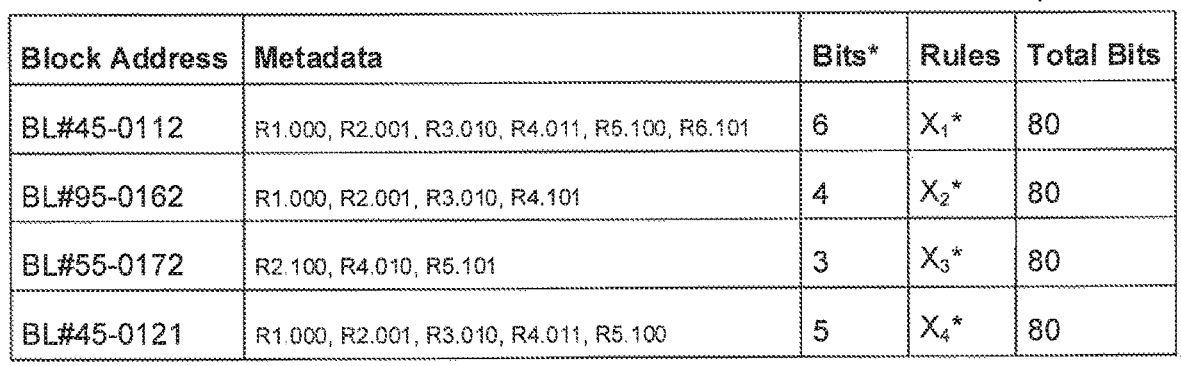
FIG. 12 is a tabular representation of exemplary compressed data blocks processed by an exemplary metamapper, in accordance with some embodiments of the present disclosure.

These metadata may be mapped with the address provided by block addressing module 202. Referring now to FIG. 12, a tabular representation 1200 of exemplary compressed data blocks processed by an exemplary metamapper 205 is illustrated, in accordance with some embodiments of the present disclosure. As illustrated, each metadata for a given data block is mapped with respective block address and corresponding sequential set of compression rules ($X_n$). The sequential set of compression rules may help to reconstruct the metadata into the original data block. Further, the block address may help in identifying original data block to which the retrieved data block may belong to, and, therefore, in reconstructing the original data block. It should be noted that, in the tabular representation 1200, a total of 80 bits have been analyzed and compressed to up to 6 bits along with a set of rules, but in real-time more than 80 bits (e.g., 32000 bits) may be actually processed and compressed to a fraction of the size. As discussed above, the compressed data may include the metadata corresponding to the minimum state matrix and the sequential set of compression rules evolved while reducing the data matrix to the minimum state matrix. Further, as stated above, the sequential set of compression rules may be stored in an efficient manner by way of reference to a set of operations to be performed on a specific rows.

Referring back to FIG. 2, the global database 206 may store the sequential set of compression rules for reducing particular blocks along with its metadata. As will be appreciated, the sequential set of compression rules may be stored in the global database 206 by using the intelligence provided by the intelligent data reduction and expansion module 204. It should be noted that each of the rule set may be unique and may depend on the data bits value. Thus, the rule set may change as per the bits framed in the matrix.

Further, the bits that are to be stored in the storage drives may be forwarded to data layer module 207. Depending on storage system architecture, the data layer module 207 may assign the actual physical address of the storage drive where the bits may be stored. It should be noted that there may be no specific constraints for storing the bits and assigning physical address to the bits, thereby making the overall system platform-independent.

It should be noted that the process of retrieving the data blocks from the compressed data is by back-propagating the compression process. Thus, the granular metadata, which were compressed to form the key-hash table, may be re-equated from the key hash table. The re-equated metadata may be stored in a stack using LIFO (Last In First Out). Thus, the last metadata may pop out first, which may then be processed to form the minimum state matrix. In particular, the minimum state matrix may be formed by parsing the metadata and assigning the respective row and column values to a matrix. Further, a bit-matrix may be derived from the minimum state matrix by back-propagating the sequential set of compression rules. The data block may then be formed from the bit-matrix. Additionally, the original data block may be formed by concatenating the retrieved data blocks using respective block address.

By way of an example, the data compression and decompression device 200 described above may reduce original data into a small granular level. The reduced data may then be stored into storage spaces. It may be noted that the storage spaces may have a varied range such as NAND cells, solid disk drives (SSDs), hard disk drives (HDDs), storage area network (SAN), or the like.

In particular, the data compression and decompression device 200 described above may reorganize, reshape, and optimize data blocks in bit levels after eliminating redundant data blocks. The original data blocks may be broken down into minute granular form. The granular form of data may then be stored in the storage spaces. As discussed above, the data blocks may be reduced to the granular form by reorganizing data as matrix so as to allow a bit-level manipulation. The reduced data blocked may be again reformed back to its original data block by back propagating the granular form of data. Moreover, the data block may be even reduced to a metadata for back propagating into the original data block.

As discussed above, existing data compression techniques such as data deduplication may be used to eliminate any redundant data blocks. For example, if a 1.6 Tb data may be required to be stored in a storage system, the data may be reduced to 1 Tb using existing deduplication techniques and stored into multiple drives with data block size 1 TB as original data. However, the data compression and decompression device 200 may further enhance the storage efficiency by reducing the 1 Tb of data block into a minute size data such as 100 Mb. As will be appreciated, the data compression and decompression device 200 may provide for intelligent data reduction and expansion module 204, which may help in reducing an original data block into a minimum state (say, up to 100 times). In particular, the compression achieved by the data compression and decompression device 200 may be anywhere from about 20% to about 80%. Moreover, only metadata may be stored which may help in reforming the data block back to its original state. Thus, the original datasets may be reduced into bit-level with minimum bits in storage area. Such an approach may help an enterprise storage system to store more amounts of data using minimal storage space.

It should be noted that the data compression and decompression device 200 may be implemented in programmable hardware devices such as programmable gate arrays, programmable array logic, programmable logic devices, or the like. Alternatively, the data compression and decompression device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for data compression and data storage optimization. For example, the exemplary system 100 and the associated data compression and decompression device 200 may perform data compression and decompression by the processes discussed herein. In particular, as will be appreciated by those of ordinary skill in the art, control logic and/or automated routines for performing the techniques and steps described herein may be implemented by the system 100 and the associated data compression and decompression device, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 13:
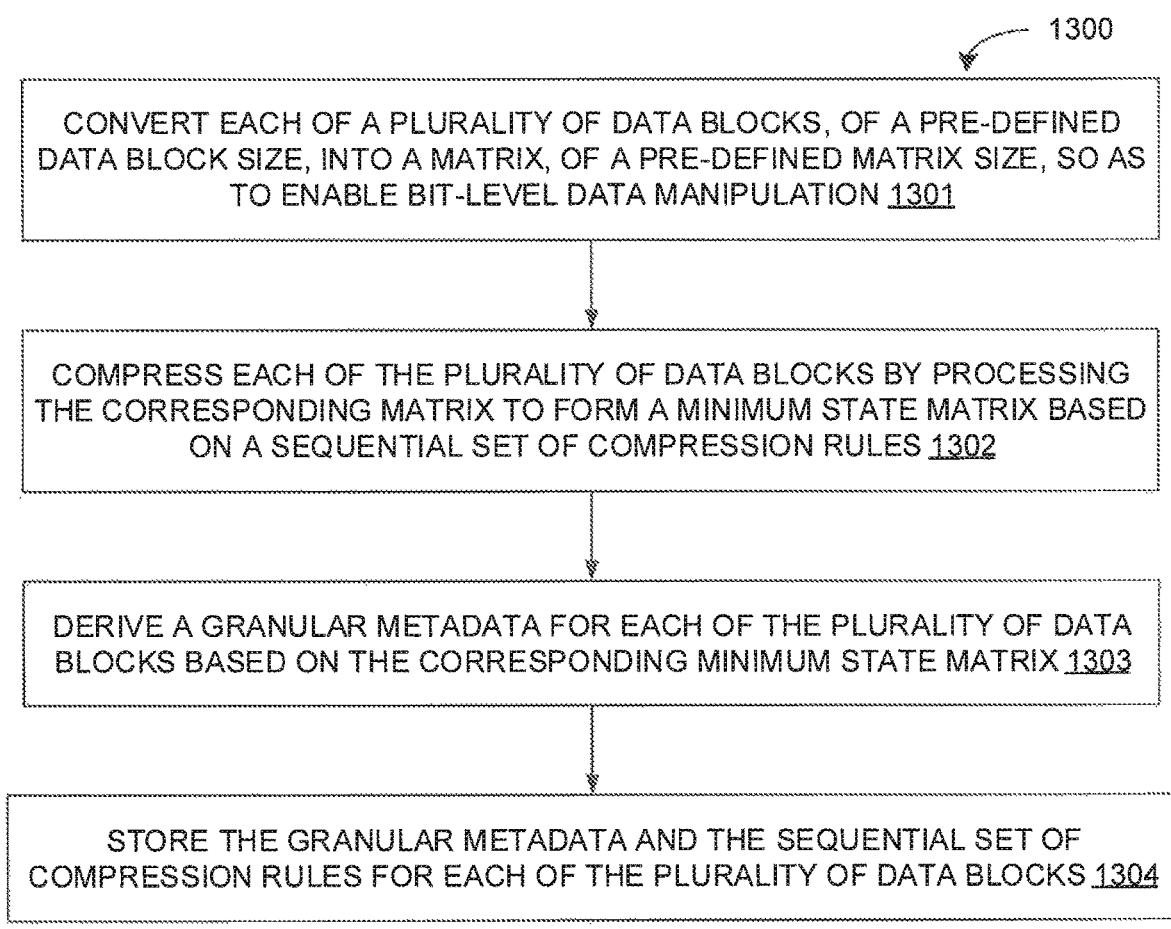
FIG. 13 is a flow diagram of an exemplary process for compressing data in accordance with some embodiments of the present disclosure.

For example, referring now to FIG. 13, exemplary control logic 1300 for compressing data via a system, such as system 100, is depicted via a flowchart in accordance with some embodiments of the present disclosure. As illustrated in the flowchart, the control logic 1300 may include the steps of converting each of a plurality of data blocks, of a pre-defined data block size, into a matrix, of a pre-defined matrix size, so as to enable bit-level data manipulation at step 1301, compressing each of the plurality of data blocks by processing the corresponding matrix to form a minimum state matrix based on a sequential set of compression rules at step 1302, deriving a granular metadata for each of the plurality of data blocks based on the corresponding minimum state matrix at step 1303, and storing the granular metadata and the sequential set of compression rules for each of the plurality of data blocks at step 1304.

It should be noted that, in some embodiments, the pre-defined block size is dependent on at least one of a computing platform or a data storage platform implementing the compression device. Additionally, in some embodiments, the pre-defined matrix size comprises a fixed number of columns and N number of rows. It should be noted that, in such embodiments, N may be determined based on the pre-defined data block size.

In some embodiments, the control logic 1300 may include the step of slicing an original data block into the plurality of data blocks. Additionally, in some embodiments, the control logic 1300 may include the step of providing a unique virtual address for each of the plurality of data blocks. In such embodiments, storing at step 1304 may include storing the granular metadata and the sequential set of compression rules mapped to the corresponding unique virtual address. Further, in some embodiments, the control logic 1300 may include the step of de-duplicating the data by removing one or more redundant data blocks. Moreover, in some embodiments, the control logic 1300 may include the step of compressing the granular metadata to form a key hash table.

In some embodiments, processing the corresponding matrix to form the minimum state matrix at step 1302 may include reorganizing matrix so as to form an identity matrix or a near identity matrix. Further, in some embodiments, processing the corresponding matrix to form the minimum state matrix at step 1302 may include the steps of initializing a row variable (i) to 'one' and a column variable (j) to 'one' to select a first matrix element ($a_{ij}$) of the corresponding matrix as a pivot element, and determining if the pivot element is 'zero'. If the pivot element is determined to be 'zero', then processing at step 1302 may further include the step of swapping the $i^{th}$ row with a $r^{th}$ row, if any, such that the pivot element after swapping is 'non-zero', wherein the $r^{th}$ row is any row from $(i+1)^{th}$ row to a last row of the corresponding matrix. However, if no such $r^{th}$ row exists, processing at step 1302 may include the step of incrementing the column variable (j) by 'one' to select a new pivot element and iterating the swapping step to a last column of the corresponding matrix. Further, processing the corresponding matrix to form the minimum state matrix at step 1302 may include the steps of dividing the $i^{th}$ row by the pivot element to reduce the pivot element to 'one', reducing all other elements in the $j^{th}$ column to 'zero' by performing a set of mathematical operations with a set of suitable multiples of $i^{th}$ row, and incrementing the row variable (i) by 'one' and the column variable (j) by 'one' to select next pivot element and iterating the process till a last row or a last column of the corresponding matrix. It should be noted that the set of mathematical operations may include at least one of subtraction, addition, division, or multiplication.

Figure 14:
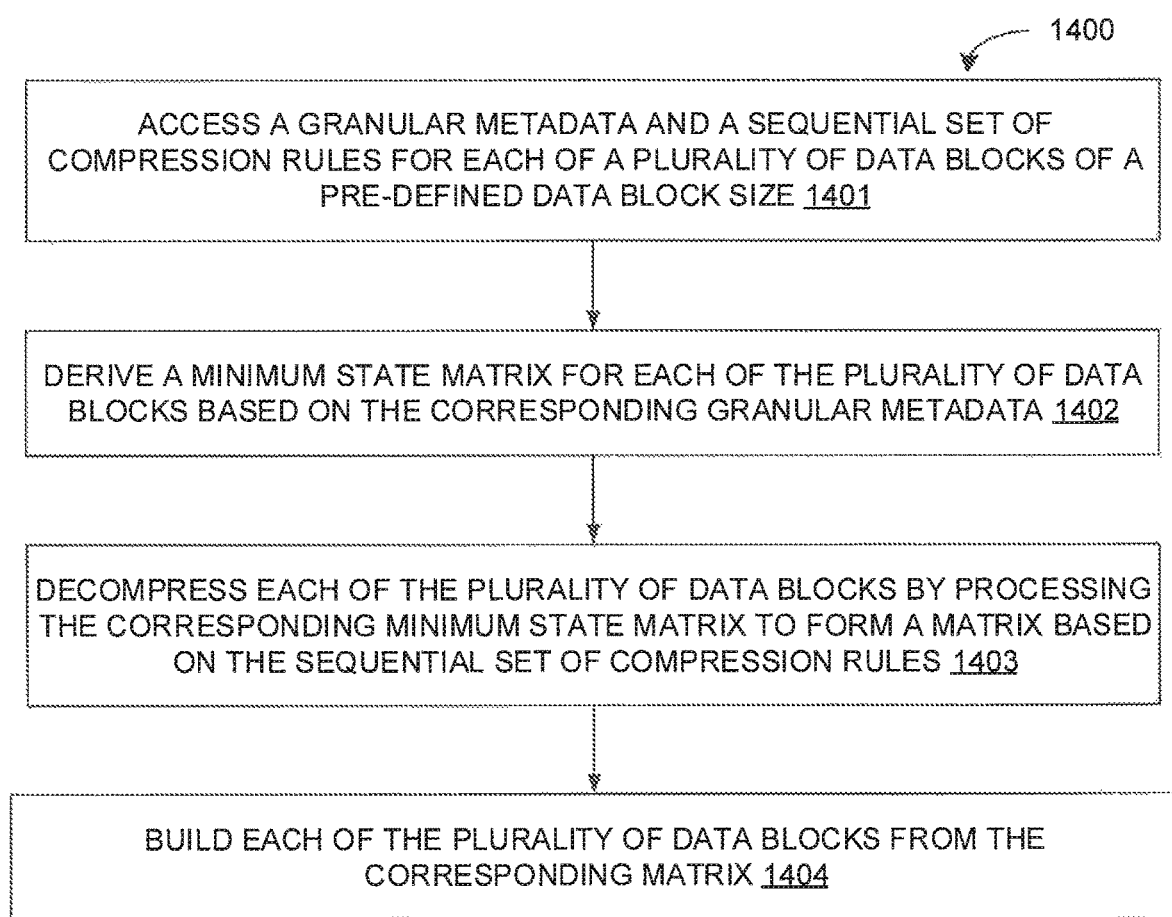
FIG. 14 is a flow diagram of an exemplary process for decompressing data in accordance with some embodiments of the present disclosure.

Referring now to FIG. 14, exemplary control logic 1400 for decompressing data via a system, such as system 100, is depicted via a flowchart in accordance with some embodiments of the present disclosure. As illustrated in the flowchart, the control logic 1400 may include the steps of accessing a granular metadata and a sequential set of compression rules for each of a plurality of data blocks of a pre-defined data block size at step 1401, deriving a minimum state matrix for each of the plurality of data blocks based on the corresponding granular metadata at step 1402, decompressing each of the plurality of data blocks by processing the corresponding minimum state matrix to form a matrix based on the sequential set of compression rules at step 1403, and building each of the plurality of data blocks from the corresponding matrix at step 1404. In some embodiments, the control logic 1400 may further include the step of reconstructing the granular metadata from a key hash table. It should be noted that the key hash table may be formed by compressing the granular metadata.

In some embodiments, accessing at step 1401 may include the step of accessing the granular metadata and the sequential set of rules mapped to a unique virtual address for each of the plurality of data blocks. Additionally, in some embodiments, deriving the minimum state matrix at step 1402 may include the steps of parsing the granular metadata and assigning respective value to each of a plurality of elements of the minimum state matrix. Further, in some embodiments, processing the corresponding minimum state matrix to form the matrix at step 1403 may include the step of computing value of each of a plurality of elements of the matrix based on the minimum state matrix by back-propagating the sequential set of compression rules.

In some embodiments, the control logic 1400 may include the step of concatenating the plurality of data blocks into an original data block. In such embodiments, concatenating may include the step of concatenating the plurality of data blocks into the original data block based on the corresponding unique virtual addresses.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 15:
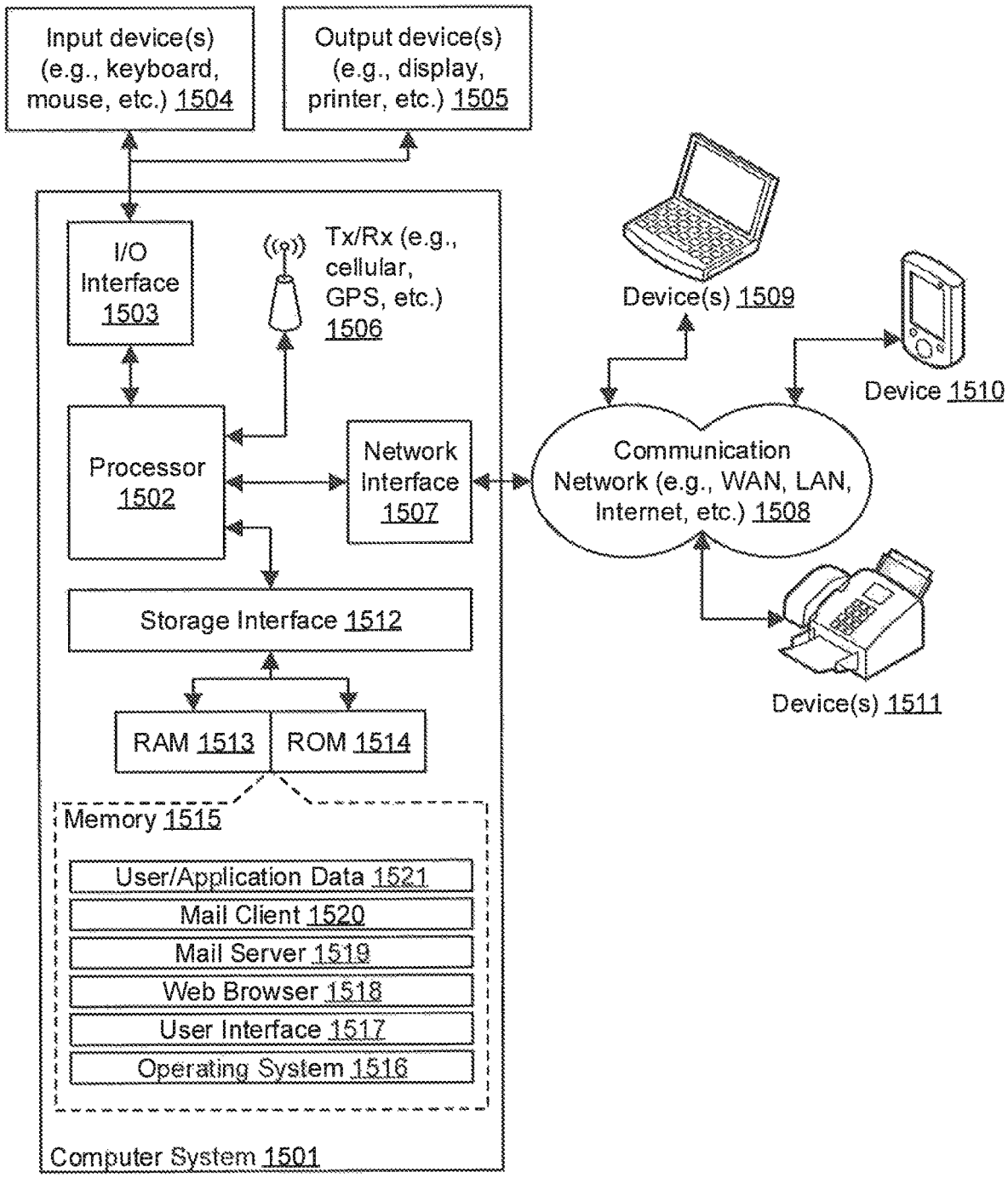
FIG. 15 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 15, a block diagram of an exemplary computer system 1501 for implementing embodiments consistent with the present disclosure is illustrated. Variations of computer system 1501 may be used for implementing system 100 for data compression and data storage optimization. Computer system 1501 may include a central processing unit ("CPU" or "processor") 1502. Processor 1502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1502 may be disposed in communication with one or more input/output (I/O) devices via I/O interface 1503. The I/O interface 1503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1503, the computer system 1501 may communicate with one or more I/O devices. For example, the input device 1504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1505 may be a printer, fax machine, video display (e.g., cathode ray tube (CRT), liquid crystal display (LCD), light-emitting diode (LED), plasma, or the like), audio speaker, etc. In some embodiments, a transceiver 1506 may be disposed in connection with the processor 1502. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1502 may be disposed in communication with a communication network 1508 via a network interface 1507. The network interface 1507 may communicate with the communication network 1508. The network interface may employ connection protocols including, without limitation, direct connect, Ethernet (e.g., twisted pair 10/100/1000 Base T), transmission control protocol/internet protocol (TCP/IP), token ring, IEEE 802.11a/bg/nix, etc. The communication network 1508 may include, without limitation, a direct interconnection, local area network (LAN), wide area network (WAN), wireless network (e.g., using Wireless Application Protocol), the Internet, etc. Using the network interface 1507 and the communication network 1508, the computer system 1501 may communicate with devices 1509, 1510, and 1511. These devices may include, without limitation, personal computer (s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT XBOX®, NINTENDO® DS®, SONY® PLAYSTATION®, etc.), or the like. In some embodiments, the computer system 1501 may itself embody one or more of these devices.

In some embodiments, the processor 1502 may be disposed in communication with one or more memory devices (e.g., RAM 1513, ROM 1514, etc.) via a storage interface 1512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1516, user interface application 1517, web browser 1518, mail server 1519, mail client 1520, user/application data 1521 (e.g., any data variables or data records discussed in this disclosure), etc. The operating system 1516 may facilitate resource management and operation of the computer system 1501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1517 may facilitate display, execution, interaction, manipulation, or operation of program components through textual or graphical facilities. For example, user interfaces may provide computer interaction interface elements on a display system operatively connected to the computer system 1501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1501 may implement a web browser 1518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH, JAVASCRIPT®, JAVA®, application programming interfaces (APIs), etc. In some embodiments, the computer system 1501 may implement a mail server 1519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT EXCHANGE®, post office protocol (POP), simple mail transfer protocol (SMTP), or the like. In some embodiments, the computer system 1501 may implement a mail client 1520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1501 may store user/application data 1521, such as the data, variables, records, etc. (e.g., original data block, data blocks of pre-defined block size, unique virtual block addresses, block names, matrix of pre-defined matrix size, minimum state matrix, set of compression rules, granular metadata, mapping among unique virtual addresses and metadata and set of compression rules, key hash table, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide a robust and efficient mechanism for data compression and data storage optimization. In particular, the techniques provide for compression of data chunks (i.e., original data blocks) before storing in actual storage space so as to increase efficiency and capacity of storage. As will be appreciated, the technique provides for data compression over and above elimination of redundant data blocks for optimized storage efficiency. In the above described techniques, the original data blocks are broken down into highly compressed granular form, and stored as such in the storage cells. The original data blocks are broken down into minute granular form by reorganizing data as matrix so as to allow a bit-level manipulation. The reduced data blocks can again reform back to its original data block by back propagating the granular form of data. The technique also allows for storing metadata that helps in reforming a reduced data block back to its original data block.

The specification has described method and system for data compression and data storage optimization. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of compressing data, the method comprising:
converting, by a compression device, each of a plurality of data blocks, of a pre-defined data block size, into a matrix, of a pre-defined matrix size, so as to enable bit-level data manipulation;
compressing, by the compression device, each of the plurality of data blocks by processing the corresponding matrix to form a minimum state matrix based on a sequential set of compression rules;
deriving, by the compression device, a granular metadata for each of the plurality of data blocks based on the corresponding minimum state matrix; and
storing, by the compression device, the granular metadata and the sequential set of compression rules for each of the plurality of data blocks.

2. The method of claim 1, further comprising slicing an original data block into the plurality of data blocks.

3. The method of claim 1, further comprising providing a unique virtual address for each of the plurality of data blocks, wherein storing comprises storing the granular metadata and the sequential set of compression rules mapped to the corresponding unique virtual address.

4. The method of claim 1, further comprising de-duplicating the data by removing one or more redundant data blocks.

5. The method of claim 1, wherein the pre-defined block size is dependent on at least one of a computing platform or a data storage platform implementing the compression device.

6. The method of claim 1, wherein the pre-defined matrix size comprises a fixed number of columns and N number of rows, and wherein N is determined based on the pre-defined data block size.

7. The method of claim 1, wherein processing the corresponding matrix to form the minimum state matrix comprises reorganizing matrix so as to form an identity matrix or a near identity matrix.

8. The method of claim 1, wherein processing the corresponding matrix to form the minimum state matrix comprises:
initializing a row variable (i) to 'one' and a column variable (j) to 'one' to select a first matrix element ($a_{ij}$) of the corresponding matrix as a pivot element;
if the pivot element is 'zero',
swapping the $i^{th}$ row with a $r^{th}$ row, if any, such that the pivot element after swapping is 'non-zero', wherein the $r^{th}$ row is any row from $(i+1)^{th}$ row to a last row of the corresponding matrix;
if no such $r^{th}$ row exists, incrementing the column variable (j) by 'one' to select a new pivot element and iterating the swapping step to a last column of the corresponding matrix;
dividing the $i^{th}$ row by the pivot element to reduce the pivot element to 'one';
reducing all other elements in the $j^{th}$ column to 'zero' by performing a set of mathematical operations with a set of suitable multiples of $i^{th}$ row, wherein the set of mathematical operations include at least one of subtraction, addition, division, or multiplication;
incrementing the row variable (i) by 'one' and the column variable (j) by 'one' to select next pivot element and iterating the process till a last row or a last column of the corresponding matrix.

9. The method of claim 1, further comprising compressing the granular metadata to form a key hash table.

10. A method of decompressing data, the method comprising:
accessing, by a decompression device, a granular metadata and a sequential set of compression rules for each of a plurality of data blocks of a pre-defined data block size;
deriving, by the decompression device, a minimum state matrix for each of the plurality of data blocks based on the corresponding granular metadata;
decompressing, by the decompression device, each of the plurality of data blocks by processing the corresponding minimum state matrix to form a matrix based on the sequential set of compression rules; and
building, by the decompression device, each of the plurality of data blocks from the corresponding matrix.

11. The method of claim 10, further comprising reconstructing the granular metadata from a key hash table, wherein the key hash table is formed by compressing the granular metadata.

12. The method of claim 10, wherein deriving the minimum state matrix comprises parsing the granular metadata and assigning respective value to each of a plurality of elements of the minimum state matrix.

13. The method of claim 10, wherein processing the corresponding minimum state matrix to form the matrix comprises computing value of each of a plurality of elements of the matrix based on the minimum state matrix by back-propagating the sequential set of compression rules.

14. The method of claim 10, further comprising concatenating the plurality of data blocks into an original data block.

15. The method of claim 14, wherein accessing comprises accessing the granular metadata and the sequential set of rules mapped to a unique virtual address for each of the plurality of data blocks, and wherein concatenating comprises concatenating the plurality of data blocks into the original data block based on the corresponding unique virtual addresses.

16. A system for compressing data, the system comprising:
a compression device comprising at least one processor and a memory for storing instructions that, when executed by the at least one processor, cause the at least one processor to perform operations comprising:

converting each of a plurality of data blocks, of a pre-defined data block size, into a matrix, of a pre-defined matrix size, so as to enable bit-level data manipulation;

compressing each of the plurality of data blocks by processing the corresponding matrix to form a minimum state matrix based on a sequential set of compression rules;

deriving a granular metadata for each of the plurality of data blocks based on the corresponding minimum state matrix; and storing the granular metadata and the sequential set of compression rules for each of the plurality of data blocks.

17. The system of claim 16, wherein the operations further comprise:

slicing an original data block into the plurality of data blocks; and providing a unique virtual address for each of the plurality of data blocks, wherein storing comprises storing the granular metadata and the sequential set of compression rules mapped to the corresponding unique virtual address.

18. The system of claim 16, wherein processing the corresponding matrix to form the minimum state matrix comprises reorganizing matrix so as to form an identity matrix or a near identity matrix.

19. The system of claim 16, wherein the operations further comprise compressing the granular metadata to form a key hash table.

20. A system of decompressing data, the system comprising:

a decompression device comprising at least one processor and a memory for storing instructions that, when executed by the at least one processor, cause the at least one processor to perform operations comprising:

accessing a granular metadata and a sequential set of compression rules for each of a plurality of data blocks of a pre-defined data block size;

deriving a minimum state matrix for each of the plurality of data blocks based on the corresponding granular metadata;

decompressing each of the plurality of data blocks by processing the corresponding minimum state matrix to form a matrix based on the sequential set of compression rules; and building each of the plurality of data blocks from the corresponding matrix.

21. The system of claim 20, wherein the operations further comprise reconstructing the granular metadata from a key hash table, wherein the key hash table is formed by compressing the granular metadata.

22. The system of claim 20, wherein deriving the minimum state matrix comprises parsing the granular metadata and assigning respective value to each of a plurality of elements of the minimum state matrix.

23. The system of claim 20, wherein processing the corresponding minimum state matrix to form the matrix comprises computing value of each of a plurality of elements of the matrix based on the minimum state matrix by back-propagating the sequential set of compression rules.

24. The system of claim 20, wherein the operations further comprise concatenating the plurality of data blocks into an original data block, wherein accessing comprises accessing the granular metadata and the sequential set of rules mapped to a unique virtual address for each of the plurality of data blocks, and wherein concatenating comprises concatenating the plurality of data blocks into the original data block based on the corresponding unique virtual addresses.

* * * * *